United States Patent [19]
Cunico

[11] Patent Number: 4,793,460
[45] Date of Patent: Dec. 27, 1988

[54] HANDLING DEVICE FOR DYNAMIC WAREHOUSING SYSTEMS

[76] Inventor: Vittorio Cunico, Via Piave no. 23, Traversetolo (Parma), Italy, 43029

[21] Appl. No.: 908,577

[22] Filed: Sep. 18, 1986

[30] Foreign Application Priority Data

Sep. 25, 1985 [IT] Italy .................................. 40097 A/85

[51] Int. Cl.$^4$ ............................................. B65G 37/00
[52] U.S. Cl. ............................. 198/465.1; 198/803.01
[58] Field of Search ............. 198/465.1, 465.2, 803.01; 29/33 p, 563; 108/51.1

[56] References Cited

U.S. PATENT DOCUMENTS

| | | | |
|---|---|---|---|
| 2,700,449 | 1/1955 | Gleason et al. | 198/465.1 X |
| 2,893,535 | 7/1959 | Kay | 198/465.1 X |
| 4,116,324 | 9/1978 | Burmeister | 198/465.1 |
| 4,468,165 | 8/1984 | Kawasaki | 198/465.1 X |
| 4,470,742 | 9/1984 | Schindler | 198/465.1 X |
| 4,552,499 | 11/1985 | Foust et al. | 198/465.1 X |

FOREIGN PATENT DOCUMENTS

| | | |
|---|---|---|
| 49121 | 5/1974 | Australia . |
| 2137910 | 1/1973 | Fed. Rep. of Germany . |
| 815470 | 9/1974 | France . |
| 580020 | 9/1976 | Switzerland . |

*Primary Examiner*—Robert J. Spar
*Assistant Examiner*—Cheryl L. Gastineau
*Attorney, Agent, or Firm*—Darby & Darby

[57] ABSTRACT

The handling device disclosed is designed for use in a dynamic warehousing system. Items of merchandise are set down on bearer frames, embodied without wheels and constructed in such a way as to sit directly upon and traverse back and forth along the rollers of a storage line. The single frame has two parallel longitudinal members at bottom which ride over the rollers, and is provided with stops that are engaged by detent mechanisms incorporated both into the line and into the platforms of devices, stationed at either end of the line, by which the single frames are loaded and offloaded.

5 Claims, 3 Drawing Sheets

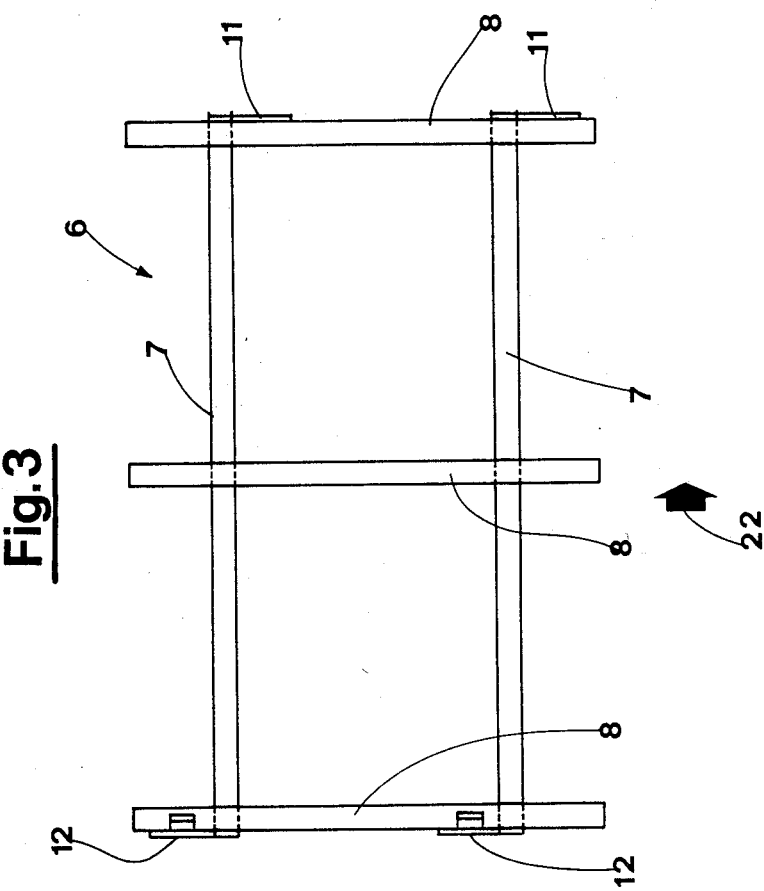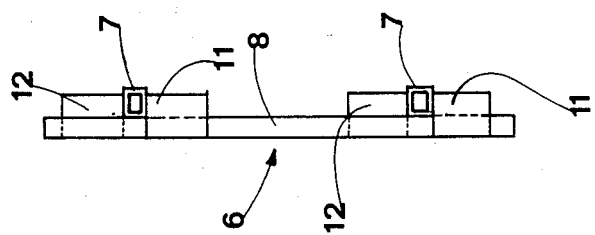

HANDLING DEVICE FOR DYNAMIC WAREHOUSING SYSTEMS

BACKGROUND of the INVENTION

The invention relates to a device for the handling of merchandise in dynamic warehousing systems.

In a dynamic type of warehousing system, items of merchandise, consisting generally of pallets or bins stacked or filled with cartons, boxes &c., do not occupy a permanent place; instead, one has a number of lines along which items are shunted one behind the next. Thus, each single line of the warehouse will carry a string of items positioned nose-to-tail along its length.

In certain systems, the lines are installed on a gradient in order that items of merchandise can gravitate nose-to-tail toward one end of the line, from which collection is made. In a 'first-in last-out' system, where set-down and pick-up operations occur at one and the same end, the single line, and in effect the entire system, will be installed on a reverse gradient. In a 'first-in first-out' type of system, the items are simply set down at one end of the line and picked up from the other.

In a first type of embodiment of conventional systems as referred to above, the line consists of rollers -i.e. of an ordinary roller conveyor, on which the pallet base is set down direct. Compared with other expedients, the roller conveyor provides the advantage of affording simple and economical adjustment of the speed at which items are propelled along the line, achieved mechanically by means of conventional brake rollers. Such an advantage is offset however, by the drawback of potential, and all-too-frequent jamming. A pallet base may be defective, or become splintered, such that one has a part or parts projecting from the moving item that can stick fast between the rollers and prevent its ongoing movement.

In another type of embodiment, the line consists in a length of track along which bogies can be rolled, the pallet in this instance being carried by the bogie. Such an expedient automatically overcomes the problem of jamming occasioned by defective pallets, though it has its attendant drawbacks, one of which is that propulsion speed of the bogies cannot be controlled simply and economically. What is more, the bogies, which are cumbersome, must be marshalled and parked in a space other than that occupied by the lines (a problem not encountered with rollers); at all events, simple logic dictates that the bogie be loaded outside the warehousing area in order that the items of merchandise can be rolled in. Further drawbacks are encountered at the collection stage, as the bogie must be either raised or tilted to effect a pick-up; one thus has the risk of a pallet load striking against that next in line, resulting in damage to the merchandise of one of the pallets, or perhaps both.

Accordingly, the object of the invention described herein is that of overcoming the drawbacks mentioned above.

SUMMARY OF THE INVENTION

The stated object is realized with a handling device for dynamic warehousing systems according to the invention.

In the device disclosed, items of merchandise are set down on bearer platforms, or frames, embodied without wheels, and constructed in such a way that they can sit directly upon and traverse back and forth along conveyor rollers. The single frame is provided with at least two parallel longitudinal members at bottom by way of which contact is made with the rollers, and with stops that are engaged by detent mechanisms incorporated into the line and into the platforms of devices, stationed at either end of the line, by which the frames are loaded and offloaded.

The device disclosed offers certain distinct advantages: movement of the items of merchandise conveyed along the line can be controlled simply and economically, using conventional brake rollers; load and offload operations are rendered notably swift, and troublefree; and a relatively simple embodiment can be adopted for the detents mechanisms incorporated into the line.

BRIEF DESCRIPTION Of THE DRAWINGS

The invention will now be described in detail, by way of example, with the aid of the accompanying drawings, in which:

FIG. 3 is the plan of a bearer frame according to the invention, viewed from above;

FIG. 4 is the right hand side view of FIG. 3.

DESCRIPTION OF THE PREFERRED EMBODIMENT

With reference to the drawings, 1 denotes a roller conveyor constituting one line of a dynamic warehousing system; in practice, the warehouse will consist in a number of such lines 1 arranged side by side and in tiers.

Figure 1:
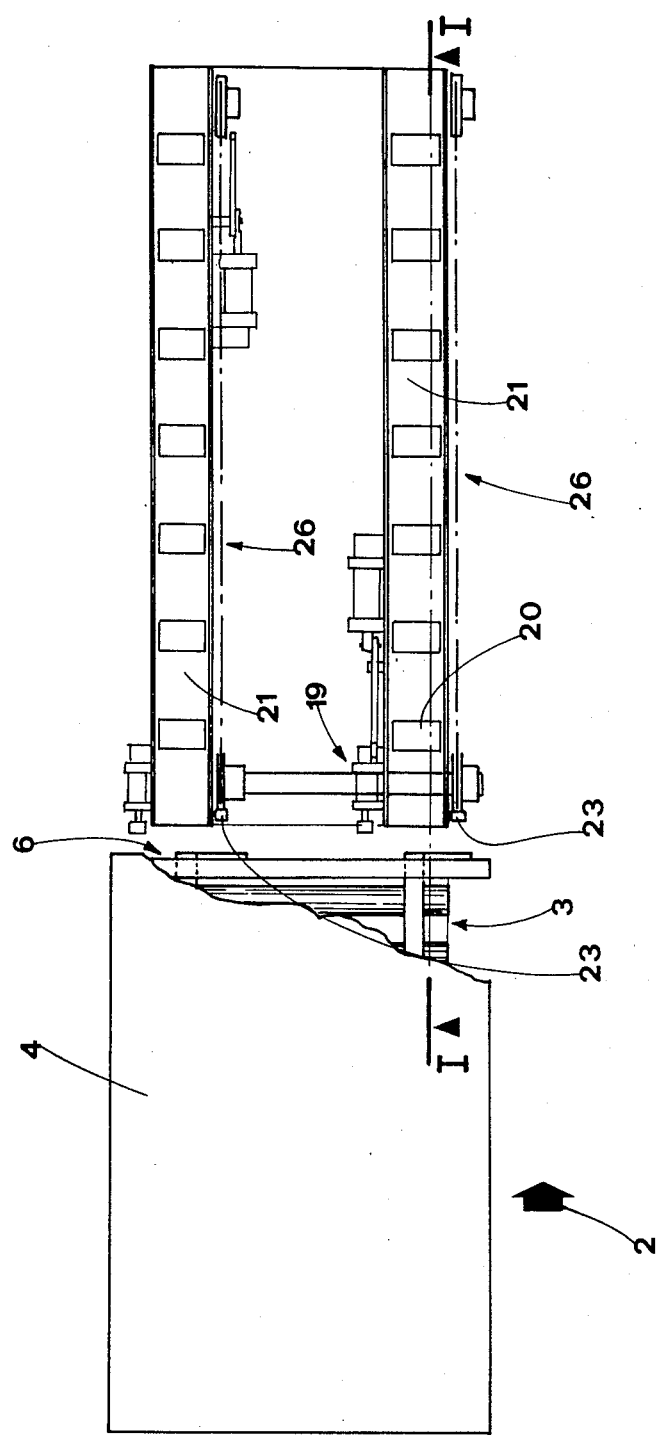
FIG. 1 is a plan of the point where merchandise is offloaded from a line in a dynamic warehousing system incorporating the device disclosed, in which the offload device is shown distanced from the line runout, and certain parts are omitted better to reveal others.
Figure 2:
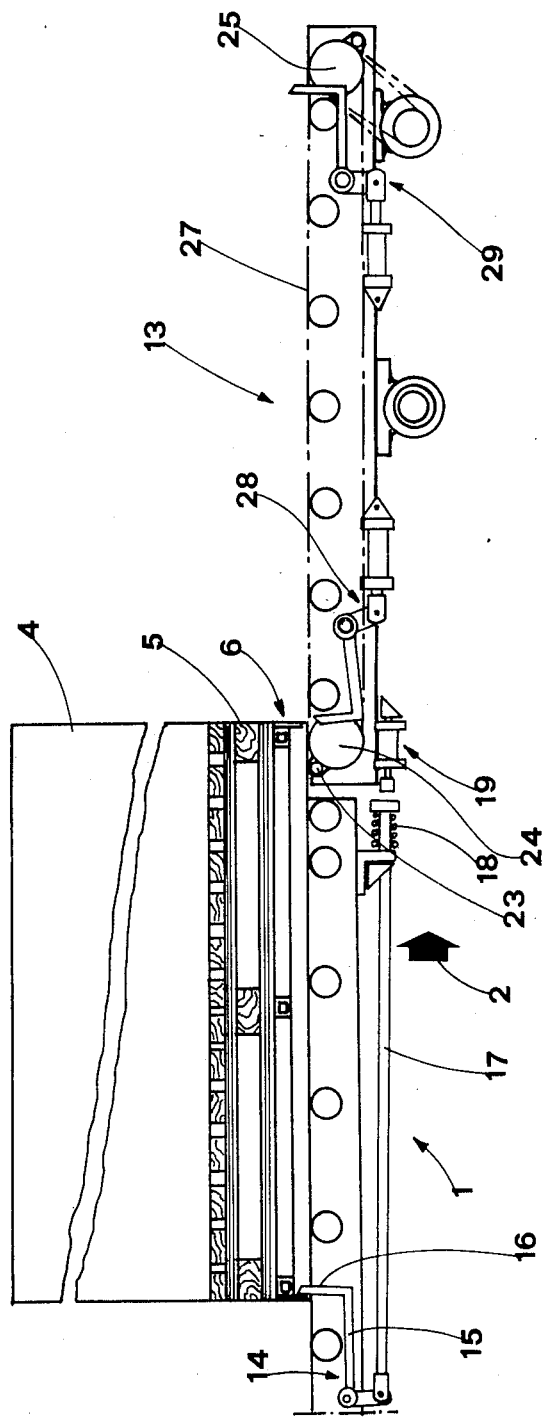
FIG. 2 is the section through I—I in FIG. 1, showing the offload device positioned up against the runout.

FIGS. 1 & 2 illustrate a runout, i.e. the end of the line from which items of merchandise are off-loaded in a first-in first-out system; in the event of a first-in last-out system being adopted, items will be loaded and offloaded onto and from the line via this same end. In either case, the line 1 will be installed on a slight gradient, such that items set down on it will gravitate in the direction of the arrow 2.

The line 1 comprises a rollerway 3, which might consist of full-width rollers laid parallel one with the next, or of sectional roller-beds likewise with parallel rollers, laid side by side.

Items of merchandise 4 stacked on pallets 5 are set down on bearer platforms, or frames 6, which have no wheels, but rather, are designed to sit directly on the crests of the rollers 3 and ride thus along the line 1. More exactly, the underside of the single frame 6 consists in two parallel and longitudinal members 7 by way of which the frame rests on the rollers 3; the two members 7 are identical, having a rectilinear axis and exhibiting regular cross section throughout, and are interconnected rigidly by three cross members 8. In the frame thus created, the three cross members 8 are attached to the top sides of the longitudinal members 7, one at either end of the frame and the third at center, and form a surface on which to set down pallets 5 carrying the stacked items of merchandise 4.

Sets of stops are fitted to the two endmost cross members of the frame, the purpose of which is to engage detent mechanisms incorporated both into the line 1, and into the platform of an offload device installed at the runout. The stops are embodied as plates attached to the front and rear ends of the frame 6 in such a way as to ride clear of the plane within which the crests of the rollers 3 and the undersides of the longitudinal members 7 are brought into contact. Observing the frame 6 in relation to the arrow 22 which indicates the traverse direction, 11 denotes the front stops, and 12 denotes the rear stops. It will also be observed that the stops of each set are fitted to the frame asymmetrically, and in such a way that a rotation of the frame through 180° about a vertical axis will bring either set of plates 11 or 12 into the precise position occupied hitherto by the remaining set 12 or 11. Whilst remaining clear of the crests of the rollers 3, the stops 11 and 12 nonetheless project downward from the cross members 8, and are offset longitudinally, each plate extending at right angles to the axis of the relative longitudinal member 7, in such a way that there is no overlap whatsoever of the several transverse areas occupied; FIG. 4 clearly illustrates the configuration: viewing the frame endwise, it can be seen that the rear set of stops 12 is in no wise obscured by the front set 11. Accordingly, propulsion or detent components can be positioned along the line 1, or at the platforms 13 of the load/offload devices, in such a way as to engage the stops at front and rear of the frame 6 without any unwarranted contact occurring.

14 denotes a detent mechanism located at the runout, positioned transversely to the rollerway 3, which engages the rear set of stops 12; thus, during the frame's traverse, the front set of stops 11 will make no contact with the detent 14. The mechanism 14 employs a pair of levers 15 pivoted about an axis disposed parallel to the axes of the single rollers. One end of each lever 15 exhibits a catch 16 that enters into contact with a relative stop of the rear set 12 offered by the frame 6; the other end of the lever 15 is hinged to one end of a long control rod 17, the remaining end of which is anchored in such a way as to permit movement exclusively in the axial direction, for all practical intents and purposes. 18 denotes a spring that serves to bias the control rod 17 toward the axial position whereby the detent engages, i.e. in the position whereby the catch 16 of each lever 15 is raised and in contact with a relative stop 12. The single control rod 17 is fitted in such a way that an actuator 19 impinging on its anchored end will produce the axial shift necessary to rotate the detent lever 15 from the engaged position (that of FIG. 2) to the disengaged position. The actuator 19 itself is located at the front end of the offload platform 13, that is, the end offered to the end of the line 1 from which merchandise is offloaded.

The platform 13, which can perform both load and offload operations alike, comprises two parallel roller beds 21 set apart at a distance such as to align with the longitudinal members 7 of a frame 6 transferred from the runout to the platform; accordingly, the rollers 20 of each bed 21 afford support to a respective member 7.

The platform 13 also incorporates a device, comprising a pair of dogs 23 that engage the set of stops 11 fitted to the front end of the frame 6, by means of which single frames 6 can be loaded onto or offloaded from the end of the line 1. Each dog 23 is made fast to a respective chain looped around two sprockets 24 and 25 turning on parallel axes, and is positioned so as to project outward from the loop. 26 denotes the single chain loop, which extends almost the entire length of the platform 13 and is positioned such that its uppermost branch 27 occupies a plane coinciding with the crests of the platform rollers 20.

With the detent mechanism 14 engaged, the frame 6 sits on the rollerway 3 with its front end slightly overhanging the runout. In this position, and with the platform 13 moved up against the end of the line so that the surface created by the platform rollers 20 provides a continuation of that created by the rollerway 3, the dogs 23 can engage the inward facing sides of the front stops 11, whereupon disengagement of the detent mechanism 14 will enable the frame 6 to be drawn off the line 1 and onto the platform 13.

The platform 13 is provided with two detent mechanisms 28 and 29, one positioned at either end, the function of which is to engage the stops 12 and 11 offered by the frame 6 occupying the platform and thus prevent unwarranted traverse of the pallet load whenever the platform is on the move. It will be appreciated, in fact, that the platform must have access to the ends of all the lines installed so as to enable load and offload of merchandise onto and from each one, and to that end will be carried by a self-propelled unit having a column on which the platform can also be raised and lowered.

Items of merchandise occupying the frames 6 will gravitate naturally into single file, given the slight gradient on which the line 1 is installed. In a rollerway 3 according to the invention, the length of the single rollers can be reduced from that of conventional pallet rollers, by reason of the fact that the distance between the longitudinal members 7 of the frame 6 is less that the width of the pallet base; the pallets can thus be accommodated by shorter rollers, affording better load bearing capacity and permitting of a lower capital outlay, assuming diameter as par. Standard brake rollers can be used to advantage in governing the speed at which pallets traverse along the line.

Only the endmost frame 6 stationed at the runout is actually held by the detent mechanism 14, which will be disengaged at the appropriate moment by operation of a mechanical linkage as the platform 13 approaches the runout; the control rod 17 forms an integral part of the linkage in question, and it will be remembered that the platform itself carries the actuator 19 by which the linkage is operated. With the frame 6 free to move, its transfer from the line 1 to the platform 13 is effected by operating the chains such that the dogs 23 locate behind the front stops 11 and pull the load forward. Once on the platform 13, the frame 6 is locked in position by the two detents 28 and 29, which engage the stops 11 and 12 offered by the frame in similar fashion to the detent mechanism 14 of the runout.

What is claimed:

1. In a handling device for dynamic warehousing systems wherein items of merchandise are set down on bearer frames capable of travel along gravity conveying lines having rollers, the improvement comprising;

a device stationed at the end of each line, provided with a platform designed to accommodate one frame and serving to load or offload frames onto or from the line;

a plurality of frames, each comprising at least two parallel longitudinal members that sit directly on each gravity conveying line, said frames having rigidly attached stops; and each line having detent mechanisms and each load-/offload platform having devices with which said stops of said frames engage, wherein said stops are embodied as sets of plates attached to front and rear ends of each frame, which project downward from cross members interconnecting said frame but do not intersect the plane within which the crests of rollers incorporated in each line and the undersides of parallel longitudinal members located at the bottom of each frame are brought into contact, and wherein the stops of front and rear sets are offset longitudinally, each of the single plates extending at right angles to the axis of a relative longitudinal member, in such a way that there is no overlap of the several transverse areas occupied.

2. Device as in claim 1, wherein a detent mechanism is incorporated into the runout of each single roller conveyor, and comprises: lever pivoted about an axis disposed parallel to the axes of the single rollers and exhibiting a catch at one end that enters into contact with a relative stop of the rear set offered by the frame; a control rod, to one end of which the lever is hinged, the remaining end of which is anchored such as to permit movement substantially in the axial direction to the end of rotating the lever between an engaged position, in which the catch is raised and enters into contact with the stop and a disengaged position; and a spring serving to bias the control rod into the axial position whereby the detent mechanism is engaged.

3. Device as in claim 2, wherein the control rod is embodied such that an actuator impinging on its anchored end will produce the axial shift necessary to rotate the detent lever from the engaged position to the disengaged position, and wherein such an actuator is fitted to that end of the load or offload platform which is offered to the runout of the roller conveyor.

4. Device as in claim 3, wherein the platform of the load or offload device comprises two parallel beds of rollers set apart at a distance such as to align with the longitudinal members of a single frame; and wherein the device, by means of which single frames are transferred from off the runout onto the platform, comprises at least one dog, designed to engage at least one stop fitted to the front end of the frame, which is made fast to and projects outward from a chain loop turning on two sprockets with parallel axes and extending almost the entire length of the platform, the uppermost branch of which occupies a plane coinciding with the crests of the platform rollers.

5. Device as in claim 4, wherein the platform is mobile and comprises two detent mechanisms located one at each end, designed to engage the respective front and rear stops of a frame (6) occupying the platform and thus inhibit its traversing in either direction.

* * * * *